Figure 1:
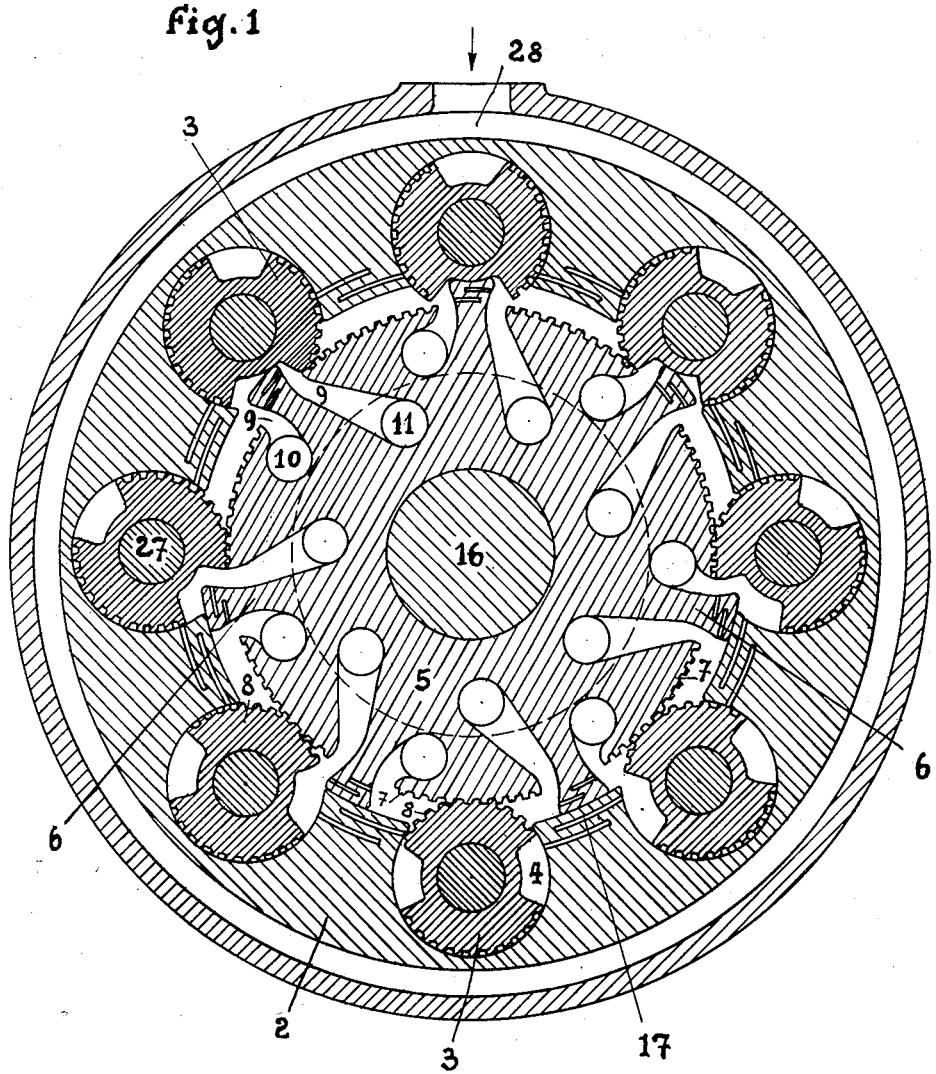

Aug. 7, 1934.    W. MAU    1,969,620
ROTARY PISTON ENGINE
Filed Dec. 10, 1931    2 Sheets-Sheet 1

Wilhelm Mau
INVENTOR
by
ATTORNEY.

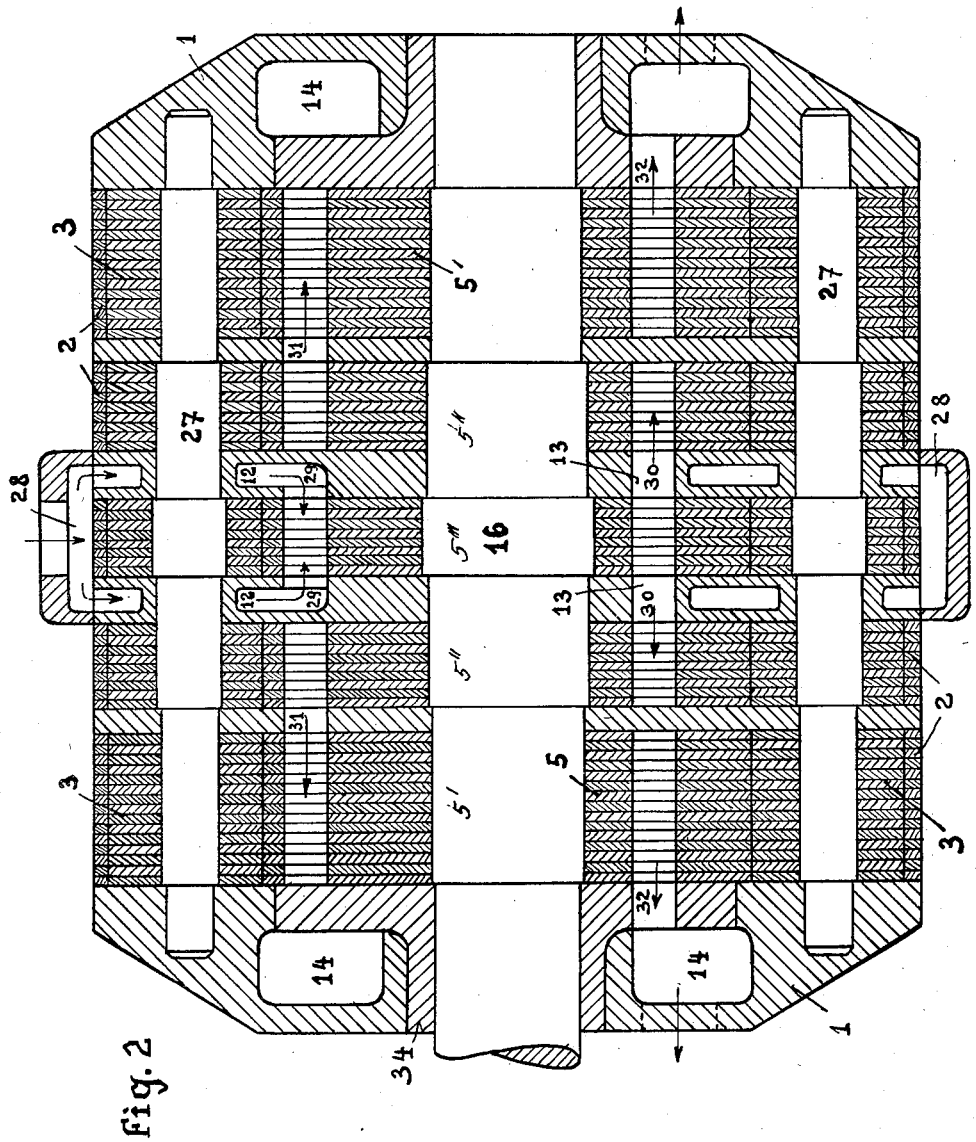

Patented Aug. 7, 1934

1,969,620

UNITED STATES PATENT OFFICE 1,969,620

ROTARY PISTON ENGINE

Wilhelm Mau, Hamburg, Germany, assignor to firm: Maschinen- und Motorenbau Gesellschaft mit beschrankter Haftung, Hamburg, Germany Application December 10, 1931, Serial No. 580,199
In Germany September 17, 1930

5 Claims. (Cl. 121—72)

This invention relates to a rotary piston engine having a piston engaging in recesses of the regulating drums by means of its driving teeth and in inlets and outlets disposed in the recessed flanks of the driving teeth. Very little practical success has hitherto been obtained with engines of this type, because of the difficulty in providing satisfactory internal packing for the individual pressure chambers formed where the teeth engage with one another, and the engine does not attain the output, expected of it. This is particularly due to the fact that the rotary abutments and the pistons, which are made in one piece, are as a whole subjected to such an alteration in size by the influence of heat, that in spite of all possible packing experiments such serious leakage occurs that the efficiency of the engine is reduced to so great an extent that it cannot be said that the engine is economical or even that it is an improvement on the other types of engines.

According to the present invention the rotary pistons and also the rotary abutments and the adjacent part of the surrounding housing are composed of discs. By constructing all cooperating parts of discs it is impossible to make better use of the known advantages of this disc arrangement in dealing with the expansion produced by thermal conditions, as thereby a more flexible compensation is obtained in all parts and the occurrence of large gaps or serious leakage is prevented with greater certainty. Whereas these advantages are obtained particularly in axial direction of the engine, a similar compensation is obtained in radial direction by arranging staggered tangential slots cut in the teeth of the rotor and the opposite parts of the housing. Here, as in the case of the disc arrangement, not only does the flexibility have a compensating effect in the physical heat expansion, but it affords the possibility of maintaining a certain constant and lasting pressure in the small intermediate spaces produced, corresponding to the pressure of the appropriate working spaces, whereby the flexibility and mutual adjustment is still further ensured.

A suitable arrangement of an engine with a plurality of expansion and compression stages can be procured by arranging the individual expansion and compression stages adjacently in axial direction to the engine, so that the pressure medium flowing laterally from stage to stage produces uniform expansion and packing conditions. In this arrangement it is advantageous to dispose the stages in such manner that a maximum pressure stage is located in the middle of the engine to which low pressure stages are connected symmetrically on both sides in the direction of the axis, so that an uniform temperature reduction from the middle towards both sides of the engine is ensured.

The accompanying drawings show an example of construction of the rotary piston engine, wherein:—

Fig. 1 is a cross section.
Fig. 2 is a longitudinal section.

The housing 1, the middle part of which consists of the discs 2 (Fig. 2) is provided with the rotary abutments 3 also composed of discs with recesses 4 and a rotor 5 on a shaft 16, having pistons 6 that engage in the spaces 4 of said abutments. The parts of the piston between the pistons 6 engage with the rotary abutments by means of auxiliary teeth 7, 8.

The lower portions of the flanks of the pistons 6 are recessed at 9 to the interior of the body of the rotor in such a manner, that the deepest parts of these recesses can be formed as inlets and outlets 10, 11. The inlets and outlets communicate by means of the lateral chambers 12, 13 (Fig. 2) with discharge chambers 14, through which the pressure medium is carried off. The mode of operation is otherwise the same as that of the known type of rotary piston engines. The number of the pistons must be smaller than the number of the rotary abutments, in order that the two inlet and outlet ports located in a chamber shall be closed at the right time.

In order to obtain furthermore a due packing between the piston head 6, and the wall of the housing, both these parts are provided with slots 17 cut in staggered relation, so that in the case of an excessive pressure on the one or on the other side a certain flexibility of the wall takes place and a packing is effected. In the case of varying expansion by changing heat a stopping (freezing) of the piston is impossible.

Fig. 2 shows especially several stages of a multi-stage engine with several rotor members 5', 5'', 5''' (composed of discs) of the different pressure stages which are arranged from the middle outwards towards both sides of the maximum pressure stage. The housing consists of two stationary end members 1, while the other parts of the housing consist of the discs 2.

Opposite the rotor members 5', 5'', 5''' are located the appropriate abutments 3, 3', 3'' on the shafts 27.

In the case of a prime mover (multi-stage engine), the course of the pressure medium is such that the medium flows from a central chamber 28 first of all into the high pressure piston member 5''' as indicated by the arrows 29, while the outflow at the corresponding parts of the piston takes place in the direction indicated by the arrows 30 into the second stage. The further outflow takes place in the next stage as indicated by the arrows 31, and the pressure medium flows out into the discharge chambers 14 of the end parts of the housing as indicated by the arrows 32. This arrangement of the stages offers the advantage that the bearings 34 located in the end parts of the housing in the low pressure stages, are subjected to only low pressure and low temperatures.

By the use of my invention such a great safety and economy of operation has been obtained as has never before been known in a rotary piston engine. Especially when the temperature and the pressure are very high, it has not heretofore been possible to avoid leakages of pressure fluids, so that all other rotary engines of similar types have failed to satisfy and have proved very uneconomical. By the new engine however, which includes not only rotary pistons, but also rotary abutments and opposed parts of the surrounding housing, all of which are composed of comparatively thin discs, the different temperature stages to which engines of the type of the invention are generally submitted are compensated in very large part. All radial parts of the pistons, the abutments and the housing may expand uniformly in axial direction, thereby affording the best condition for securing the necessary tightness in this direction against undesired escape of fluids. Besides this, the radial expansion of the opposed sliding parts of the housing and the pistons is compensated completely due to the new arrangement of the different parts of the engine. These effects were never before obtained by other engines of this type, though some of them had a few parts which were divided into several distinct sections. But it was only by combining a large number of comparatively thin sheets of material engaging with opposed parts similarly constructed has the desired result been obtained, and not merely by sectioning into thick plates a few of the corresponding parts of the engine. In this way the inventor has succeeded in securing complete tightness at all temperatures and at all pressures, which advantages were never secured before. The cited attempts to laminate the working parts of a small number of elements of the engine but without paying any heed to the thickness of such laminae may be sufficient in cases where the working fluid has a comparatively low temperature, but in other cases where this fluid is of high temperature the compensation of the expansion of the material would be distinctly insufficient, because the walls of the housing surrounding the expansion chamber could not afford the same compensation, and therefore there will follow leakage in some instances while in other instances binding or friction will occur.

The new arrangement of the circumferential slots in the pistons and in the opposite parts of the housing, which act reciprocally against each other, is intended for reinforcing the tightening action of the sheet-structure and the combined effect of both measures in axial and radial direction affords a means for securing complete tightness in all directions. The circumferential slots are arranged in such a manner as to compensate for all radial expansion of the opposed sliding parts of the housing and the pistons.

As a result it may be said that the new arrangement overcomes all drawbacks of the rotary engines hitherto known and provides an economical and satisfactorily working rotary engine, which has a desirable mechanical efficiency and such a low proportion of waste as has not heretofore been known in engines of this character.

I claim:

1. A rotary piston engine having a housing, a rotor therein, pistons on the rotor, and rotary abutments engaging said pistons, wherein the pistons, the rotary abutments and the parts of the surrounding housing opposite said pistons are composed of relatively thin discs, the pistons and the adjacent portions of the housing being provided with staggered circumferential slots to provide flexibility in order to compensate for expansion in radial direction.

2. A rotary piston engine having a housing, a rotor therein, pistons on the rotor and rotary abutments engaging said pistons, wherein the pistons, the rotary abutments and the parts of the surrounding housing opposite said pistons are all composed of comparatively thin discs and the pistons as well as the adjacent portions of the housing between the rotary abutments are provided with staggered circumferential slots to provide flexibility in radial direction.

3. A rotary engine comprising a cylindrical casing, a rotor coaxial therewith, radial pistons on the rotor, and rotary abutments located in recesses of the casing coacting with said pistons, the pistons and the segments of the casing between abutments having circumferentially extending slots in their lateral faces providing radially expansible flanges adapted to coact to prevent escape of steam.

4. A rotary engine comprising a cylindrical casing having spaced axially extending cylindrical recesses in its inner wall, longitudinally slotted rotary abutments in said recesses, and a rotor having radially extending pistons adapted to enter the slots in said abutments, the pistons and the segments of the housing between said recesses therein each having longitudinal slots of substantial depth in their lateral faces to provide on each of said parts an expansible flange coacting with a similar flange on an opposed part for preventing escape of steam.

5. In a rotary engine having a cylindrical housing a coaxial relatively rotary element, pistons fixed to one of said relatively rotary parts, spaced rotary abutments on the other of said parts coacting with said pistons, the extremities of the pistons and the fixed parts opposed thereto each having slots in its lateral faces to provide thin terminal flanges which are expansible to prevent escape of steam.

WILHELM MAU.